United States Patent
Sun et al.

(10) Patent No.: US 9,223,964 B2
(45) Date of Patent: Dec. 29, 2015

(54) DETECTING JAVA SANDBOX ESCAPING ATTACKS BASED ON JAVA BYTECODE INSTRUMENTATION AND JAVA METHOD HOOKING

(71) Applicant: McAfee, Inc., Santa Clara, CA (US)

(72) Inventors: Bing Sun, Santa Clara, CA (US);
Xiaobo Chen, Fremont, CA (US);
Chong Xu, Sunnyvale, CA (US); Hirosh Joseph, Bangalore (IN)

(73) Assignee: McAfee, Inc.

( * ) Notice: Subject to any disclaimer, the term of this patent is extended or adjusted under 35 U.S.C. 154(b) by 78 days.

(21) Appl. No.: 14/098,299

(22) Filed: Dec. 5, 2013

(65) Prior Publication Data

US 2015/0161381 A1    Jun. 11, 2015

(51) Int. Cl.
*G06F 21/00* (2013.01)
*H04L 29/06* (2006.01)
*G06F 21/53* (2013.01)
*G06F 21/54* (2013.01)
*G06F 21/51* (2013.01)
*G06F 21/52* (2013.01)
*G06F 21/57* (2013.01)

(52) U.S. Cl.
CPC ............... *G06F 21/53* (2013.01); *G06F 21/54* (2013.01); *G06F 21/577* (2013.01)

(58) Field of Classification Search
CPC ........ G06F 21/53; G06F 21/57; G06F 21/577
See application file for complete search history.

(56) References Cited

U.S. PATENT DOCUMENTS

| | | | |
|---|---|---|---|
| 2007/0261124 A1* | 11/2007 | Centonze et al. | 726/27 |
| 2008/0016339 A1* | 1/2008 | Shukla | 713/164 |
| 2013/0145463 A1* | 6/2013 | Ghosh et al. | 726/22 |

FOREIGN PATENT DOCUMENTS

WO    WO 2014111922 A1 *  7/2014

OTHER PUBLICATIONS

Kishore, K.R.; Mallesh, M.; Jyostna, G.; Eswari, P.R.L.; Sarma, S.S.; "Browser JS Guard: Detects and defends against Malicious JavaScript injection based drive by download attacks"; Applications of Digital Information and Web Technologies (ICADIWT), 2014 Fifth International Conference on the Year: Jan. 2014; pp. 92-100.*

* cited by examiner

*Primary Examiner* — Andrew Nalven
*Assistant Examiner* — Courtney Fields
(74) *Attorney, Agent, or Firm* — Blank Rome LLP

(57) ABSTRACT

By injecting bytecode into a predetermined method of a sandbox environment, an application that uses an exploit to attempt to escape from the sandbox environment may be detected without knowledge of the application or the exploit used to attempt to escape from the sandbox environment. Upon indicating that the application has escaped the sandbox, the application may be terminated or the escape may be reported, allowing further monitoring of the application.

21 Claims, 7 Drawing Sheets

DETECTING JAVA SANDBOX ESCAPING ATTACKS BASED ON JAVA BYTECODE INSTRUMENTATION AND JAVA METHOD HOOKING

TECHNICAL FIELD

Embodiments described herein generally relate to the field of computer security, and in particular to a technique for detecting an application that escapes a sandbox environment.

BACKGROUND

A sandbox is a restricted environment in which untrusted software may be executed in a way that limits the ability of the untrusted software to perform actions that might be exploited by malware. The sandbox may be used as a development environment, limiting the effects of errors that could damage an unprotected environment. Similarly, a sandbox may be used for testing untrusted software, such as software obtained from an untrusted source. Essentially, the programmer must write code that "plays" only within the sandbox, much as children are allowed to make anything they want to within the confined limits of a real sandbox, but without being allowed to escape from the sandbox on their own.

Some programming environments, such as the JAVA® platform available from Oracle America, Inc. provide a sandbox environment as part of their development environment. ("JAVA" is a registered trademark of Oracle America, Inc.) In the JAVA development environment, the sandbox is a security measure that establishes a set of rules that are used when creating an applet that prevents certain functions when the applet is sent as part of a Web page, for example. When a browser requests a Web page with applets, the applets are sent automatically and can be executed as soon as the page arrives in the browser. If the applet were allowed unlimited access to memory and operating system resources, it could do harm if the applet were malware. The sandbox creates an environment in which there are strict limitations on what system resources the applet can request or access. In addition to the rules, the JAVA language provides code checkers to guarantee adherence to the limitations of the sandbox.

However, as in every security environment, weaknesses or flaws in the security environment may be exploited once discovered to escape from the sandbox and access resources that the sandboxed software should not be able to access. Intrusion prevention systems attempt to protect against vulnerabilities in an operating system, application, or development environment that would allow such exploits to succeed. Typically, such intrusion prevention systems have used customized sandboxes or virtual machines to monitor exploit behaviors and signature-based detection of sandbox exploits, similar to traditional anti-malware software. However intrusion prevention systems often fail to detect exploits, such as exploits that have not yet been analyzed (often referred to as 0-day exploits). Alternatively, some conventional approaches produce false positive indications, calling something an exploit that is not. A better approach would be helpful.

DESCRIPTION OF EMBODIMENTS

Figure 1:
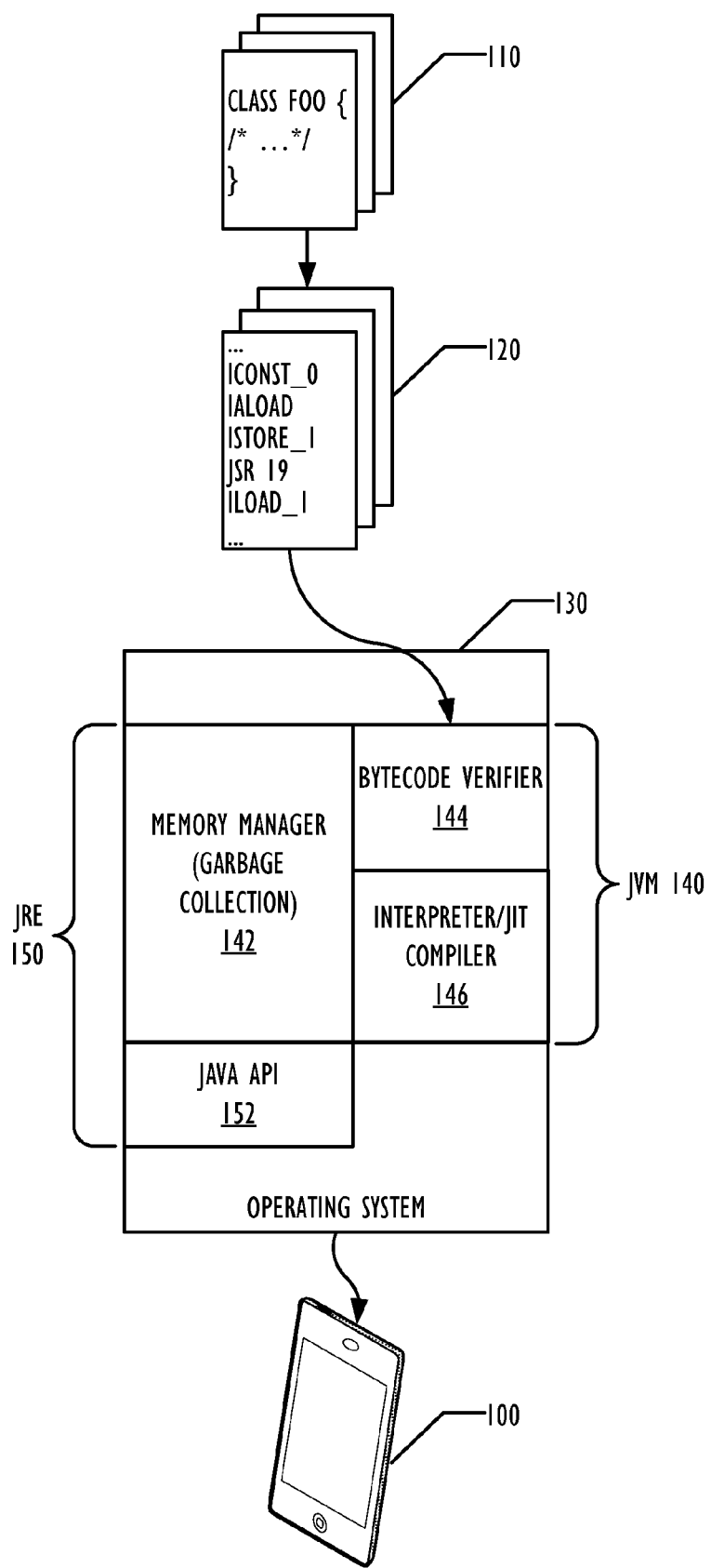
FIG. 1 is a block diagram illustrating a programmable device providing a sandbox environment according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device.

Although described below in terms of a JAVA sandbox environment, the techniques described below are not limited to such an embodiment, but may be used in any sandbox environment in which a generic sandbox may be modified at runtime to detect attempts to manipulate certain functionality of the sandbox that would allow escaping the sandbox in that environment. While the description below is written in terms instrumenting the JAVA SecurityManager( ) method and the EXEC( ) methods provided by the JAVA sandbox, other methods that may be determined as likely to be used by an exploit attempting to escape the sandbox may be instrumented to provide additional detection of exploits.

The exploits of concern below are those that attempt to escape the restrictions imposed by the sandbox environment. Malware that may exploit other weaknesses of the sandbox environment but which do not attempt to escape the sandbox may also be detected using similar techniques where the sandbox implements functionality that most such exploits would use, regardless of the nature of the exploit. However, malware that seeks to escape from a sandbox, regardless of the technique used for the escape attempt, may need to avail itself of privileged methods to run code out of the sandbox. Therefore, the techniques described below instrument methods used by malware to obtain privileges restricted by the sandbox, and have proven effective in detecting and allowing termination of all such escape attempts.

A sandbox is typically a set of rules used to protect resources of the system on which the sandbox is implemented. Sandboxes may implement different levels of protection, in which different levels allow access to different sets of resources. A minimal sandbox allows just enough resources for a program to run, and an open sandbox may allow access to allow resources the host system normally can access. A typical sandbox may allow the program running in the sandbox access to the processor, its own memory, and access to the web server from which the program was loaded.

An application may use a technique, referred to herein as an exploit, to gain or modify permissions or privileges given to the application or to modify, turn off, or disable other security controls. The sandbox uses permissions, privileges, and security controls to control access to resources, and generally limits the permissions, privileges, and security controls available to the application running in the sandbox. An exploit typically exploits a weakness or flaw in the sandbox environment. Gaining or modifying the permissions, privileges, or security controls is part of the exploit. An attempt to escape the sandbox is defined as an attempt to use those permissions, privileges, or security controls to perform an action that would have been prevented by the sandbox environment. An actual escape occurs when the application succeeds in performing the action, such as executing code outside of the sandbox environment. The techniques described below provide a way to detect an attempt to escape the sandbox environment, allowing the sandbox environment to prevent those actions from being performed.

FIG. 1 is a block diagram illustrating a JAVA environment running on a mobile device 100 according to one embodiment in which the monitoring techniques described below are used to detect and prevent JAVA programs from escaping the sandbox. The JAVA Virtual Machine (JVM) 140 provides a runtime environment in which JAVA bytecode can be executed. The JVM 140 is typically is distributed along with JAVA Class Library, a set of standard class libraries (in JAVA bytecode) that implement the JAVA Application Programming Interface (API) 152. These libraries, bundled together with the JVM 140, form the JAVA Runtime Environment (JRE) 150.

The JAVA source code programs in source code files 110 that are intended to run on a JVM are compiled into Java bytecode files 120, in a standardized portable binary format that typically comes in the form of .class files (JAVA class files). A program may consist of many classes in different files. For easier distribution of large programs, multiple class files may be packaged together in a .jar file (a JAVA archive). These bytecode files 120 are then verified by a bytecode verifier 144 in the JVM 140. Although illustrated as actual files, either or both of the source code files and bytecode files may not be files of a file system of the programmable device 100, but may be in-memory representations that are provided as input to the JAVA compiler or JVM 140.

The JVM 140 typically includes a memory manager 142 to do garbage collection, a bytecode verifier 144, and an interpreter/Just-In-Time (JIT) compiler 146. The JVM 140 runtime executes .class or .jar files 120, emulating the JVM instruction set by interpreting it or using a just-in-time compiler (JIT). JIT compiling, not interpreting, is used in most JVMs 140 today to achieve greater speed. There are also ahead-of-time compilers that enable developers to precompile class files into native code for particular platforms.

The bytecode files 120 are verified by the bytecode verifier 144, to determine that the bytecode is safe, so that no program running in the JVM 140 can crash the programmable device 100 or otherwise interfere inappropriately with other operations on the programmable device 100. Certain methods and data structures belonging to trusted code are protected from access or corruption by untrusted code executing within the same JVM 140. Furthermore, common programmer errors that often lead to data corruption or unpredictable behavior such as accessing off the end of an array or using an uninitialized pointer are not allowed to occur.

The JVM verifier 144 verifies all bytecode before it is executed. This verification consists primarily of three types of checks: (a) branches are always to valid locations; (b) data is always initialized and references are always type-safe; and (c) access to private or package private data and methods is rigidly controlled. The first two of these checks take place primarily during the verification step that occurs when a class is loaded and made eligible for use. The third is primarily performed dynamically, when data items or methods of a class are first accessed by another class.

The verifier 144 permits only some bytecode sequences in valid programs, e.g. a jump (branch) instruction can only target an instruction within the same method.

Although a mobile device 100 is illustrated in FIG. 1, any time of programmable device capable of supporting a JVM 140 can support this environment, including personal computers, servers, mainframes, and embedded devices, for example. In addition, although the JRE 150 in FIG. 1 runs under an operating system 130, JREs can be implemented that run directly on the hardware without an underlying operating system. Although generally the JRE 150 runs programs originally written in the JAVA language, other programming languages may be compiled into bytecode for running on the JVM 140.

The sandbox created by the JVM 140 may be used for monitoring the behavior of applets (JAVA programs embedded in a web page) or standalone JAVA applications. As used in the description below, the term "application" is intended to include both applets and standalone applications.

Figure 2:
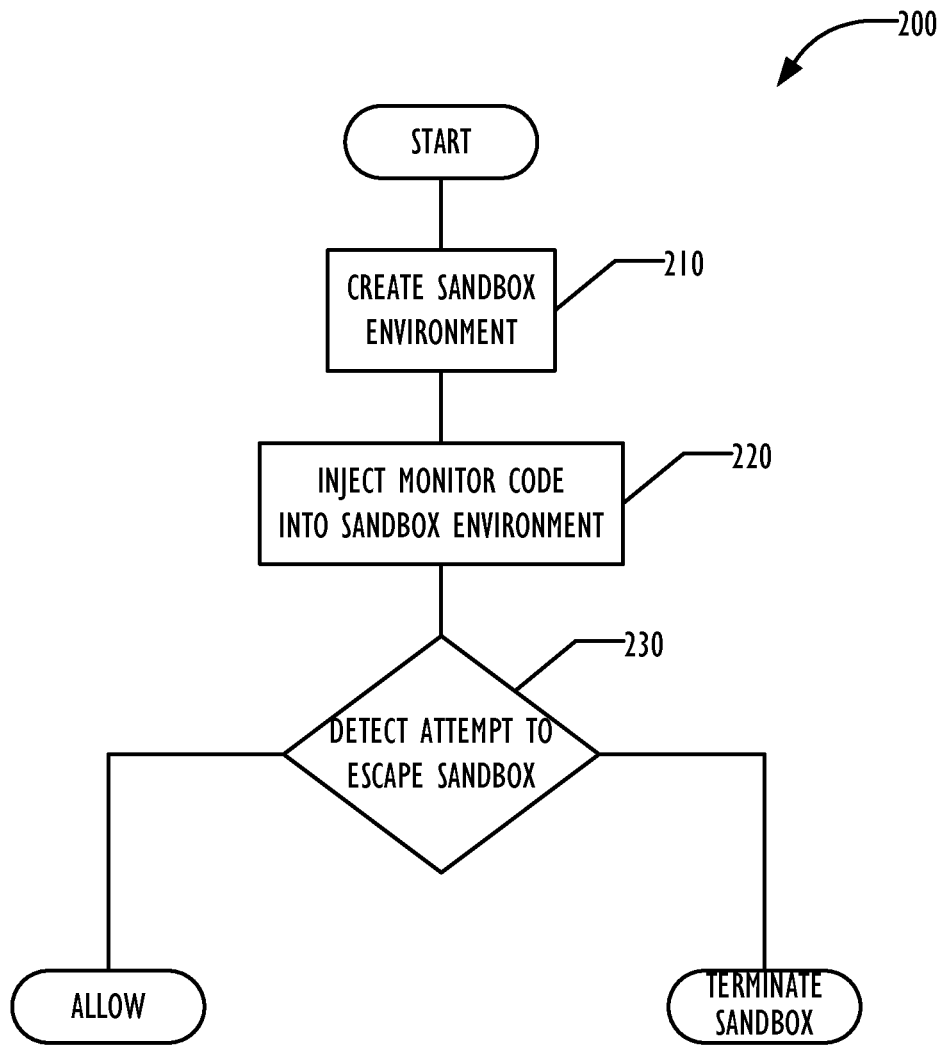
FIG. 2 is a flowchart illustrating a technique for instrumenting a sandbox according to one embodiment.

FIG. 2 is a flowchart illustrating a general technique 200 for dynamically modifying a sandbox to detect attempts to escape a sandbox environment according to one embodiment. In block 210, the sandbox environment is created or instantiated. In block 220, monitoring code may be injected into the sandbox environment. The monitoring code modifies one or more predetermined methods of the sandbox objects, instrumenting the methods to detect attempts to escape the sandbox without depending upon knowledge of the exploit attempting to escape the sandbox or post-escape behavior. Thus, for example, the monitoring code does not use or depend upon signatures of the exploit. In block 230, if the monitoring code determines that an attempt has been made to escape the sandbox, the sandbox may be terminated; alternatively the sandbox may be allowed to continue execution, but the application or application running in the sandbox is terminated. In yet another alternative, not illustrated in FIG. 2, the application making the escape attempt may be allowed to proceed, but information about the escape may be reported or stored for later analysis. If no escape attempts are detected, then the sandbox may allow execution of the application.

Figure 3:
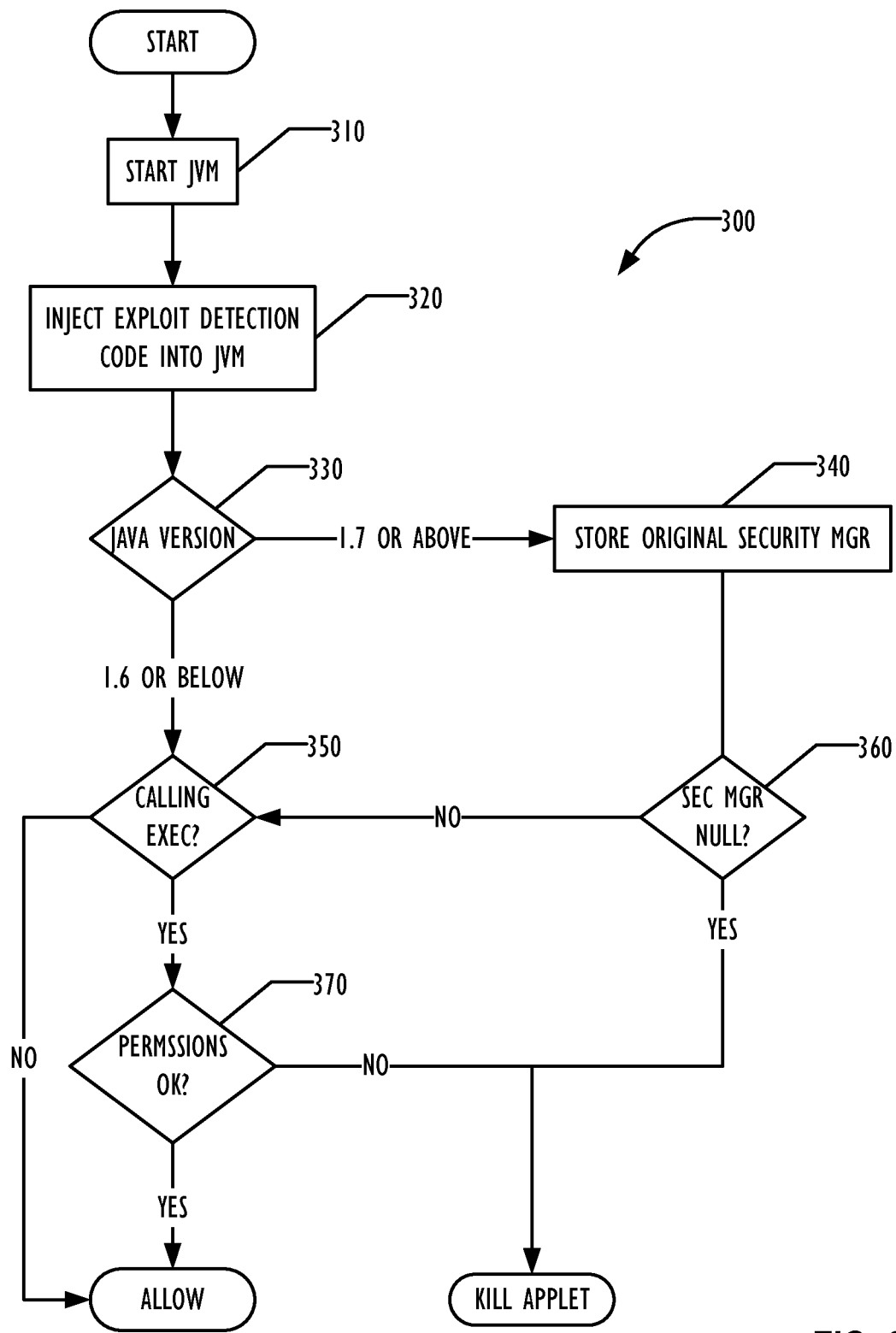
FIG. 3 is a flowchart illustrating a technique for instrumenting a JAVA sandbox according to one embodiment.

FIG. 3 is a flowchart of illustrating a JAVA-specific embodiment of the general technique 200. The JAVA-specific technique 300 instruments a JAVA sandbox environment. In block 310, the JVM 140 is started, and a sandbox environment is created in the JVM 140 which limits what system resources an application running in the sandbox can request of access, allowing untrusted executable code to be run safely. In some embodiments, the technique 300 instruments the JVM 140 using the premain method invoked after the JVM 140 is initialized but before the JVM 140 is started. In other embodiments, the technique 300 instruments the JVM 140 using the agentmain method or some other method invoked after the JVM 140 is started.

In block 320, exploit detection code is injected into the JVM, instrumenting the JVM that provides the sandbox. Different versions of the JVM may be instrumented differently. For example, version 1.7 of the JVM provided by Oracle Corporation, one of the more common JVMs, introduced a SecurityManager class that can be used by the instrumentation of the JVM, while versions 1.6 and earlier, which do not provide the SecurityManager class, may use a different instrumentation technique involving a runtime method known as EXEC. Therefore, in one embodiment in block 330 the version of the JVM may be checked and different handling techniques used depending on that check.

In a JVM version 1.7 or greater system, almost every application will instantiate a SecurityManager object of the SecurityManager class when the application is running inside the JVM 140. This object is used to define a security policy for an application: typically including checkRead, checkWrite, checkConnect, etc. methods. The SecurityManager object is consulted by code in the JAVA library whenever a dangerous operation is about to be carried out. The SecurityManager object is thereby given an opportunity to prevent completion of an operation by throwing a security exception.

In order to successfully run code out of the JAVA Sandbox, the exploit must disable the SecurityManager object before the exploit can run the privileged JAVA code necessary to escape the JAVA sandbox. In one embodiment, the System.getSecurityManager and System.setSecurityManager methods are hooked in the java.lang.System class with detection logic. The detection logic, illustrated in blocks 340 and 360, checks if the original SecurityManager object has been changed or disabled, hooking the setSecurityManager method to store the original SecurityManager object in block 340 at initialization of the sandbox, and then checking in block 360 with the getSecurityManager method whether the SecurityManager object is null or disabled. If the SecurityManager object has been disabled or is null, that indicates an escape attempt has occurred, and the application attempting to escape from the sandbox may be terminated.

As stated above, some embodiments of the JAVA environment, such as JRE 1.6 and earlier, do not employ a SecurityManager class or object. In such embodiments, an EXEC method of the Java.lang.Runtime class may be hooked with detection logic. This detection logic may also be employed in embodiments of the JAVA environment that do employ a SecurityManager class, in addition to or instead of the SecurityManager detection logic.

The detection logic for a JRE 1.6.x embodiment is a little bit different as an attacker does not have to disable a SecurityManager object to run code out of sandbox. Instead, an attacker can just change the permissions. If the JAVA application tries to call a privileged method such as ClassLoader, the application will get the following error of "permission denied":

```
java.security.AccessControlException: access denied ("java.lang.RuntimePermission"
"createClassLoader")
    at java.security.AccessControlContext.checkPermission(Unknown Source)
    at java.security.AccessController.checkPermission(Unknown Source)
    at java.lang.SecurityManager.checkPermission(Unknown Source)
    at java.lang.SecurityManager.checkCreateClassLoader(Unknown Source)
    at java.lang.ClassLoader.checkCreateClassLoader(Unknown Source)
    at java.lang.ClassLoader.<init>(Unknown Source)
...
```

After the attacking application is able to bypass the JAVA sandbox, the application can simply call code similar to the following to obtain the full permissions:

```
URL localURL = new URL("file:///");
Certificate[ ] arrayOfCertificate = new Certificate[0];
Permissions localPermissions = new Permissions( );
localPermissions.add(new AllPermission( ));
ProtectionDomain localProtectionDomain = new ProtectionDomain(new
CodeSource(localURL, arrayOfCertificate), localPermissions);
```

Therefore, in one embodiment, the detection logic for JRE 1.6.x environments may hook some methods that will be always used in a JAVA exploits that attempt to run code outside of the sandbox, for example, Runtime.getRuntime( ).Exec( ). Applications running in a sandbox that do not contain an exploit attempting to escape the sandbox generally do not call the EXEC method. By injecting code into the JVM 140 to hook the EXEC method, we can check the permission status whenever the EXEC method is called in block 350. Normally, a JAVA application is not supposed to have full permissions inside the JAVA sandbox. If the permissions are at an appropriate level for the sandbox in block 370, the execution of code to be performed by the EXEC method may be allowed; otherwise, the application that appears to be trying to escape the sandbox may be terminated. Although the EXEC method is identified as hooked in FIG. 3, other methods can be hooked instead of or in addition to EXEC as desired.

Any predetermined set of permissions may be used as an indication that an application is attempting to use an exploit to escape the sandbox. While in many cases, the exploit may set the application to have full permissions, in some cases the exploit will only set the application as having the permissions needed to perform whatever action is intended by the exploit. In some embodiments, an application may be indicated as attempting to escape the sandbox if the application has a predetermined specific permission.

In some embodiments, instead of just terminating the application that appears to be attempting to escape the sandbox, the entire sandbox or the JVM 140 itself may be terminated if desired. Alternately, instead of killing the application, sandbox, or JVM 140, the detection logic may simply report the escape attempt.

To enable instrumentation of the JVM 140 in one embodiment, an agent is deployed as a JAR file. An attribute in the JAR file manifest specifies the agent class that will be loaded to start the agent. The agent may be loaded with a command line interface, by adding a –javaagent:jarpath[=options] switch to the command line, where "jarpath" is the path to the agent JAR file and "options" are the agent options. If needed, the javaagent switch may be used multiple times on the same command line, allowing creating multiple agents. More than one agent may use the same jarpath. Alternately, the JVM 140 may implement a mechanism that uses dynamic loading to start agents after the JVM 140 has started, allowing a tool to attach an agent to a running JVM 140.

Figure 4:
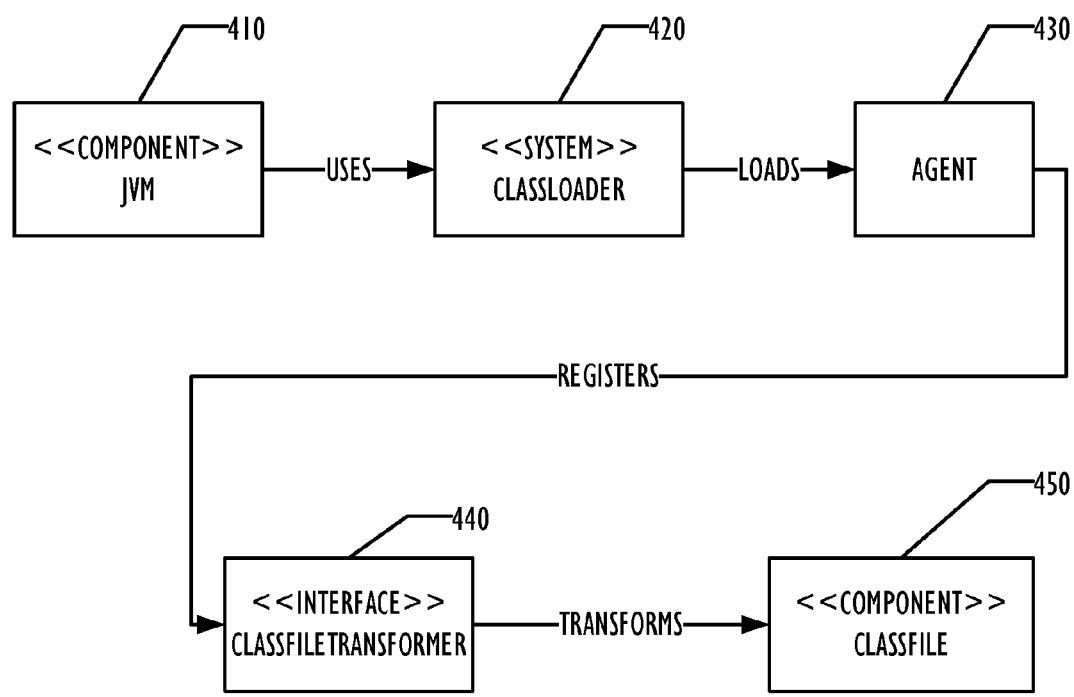
FIG. 4 is a block diagram illustrating a technique for instrumenting a JAVA sandbox according to one embodiment.

As illustrated in FIG. 4, after the JVM has initialized, the JVM component 410 uses the system ClassLoader method 420 to load the agent class 430 containing the bytecode to be injected into the JVM 140. The JVM 140 then instantiates an Instrumentation interface implementation and given the context, invokes a method implemented by the agent class 430. The agent class 430 registers a ClassFileTransformer Interface 440, which transform the class file for the JVM 140, injecting the bytecode of the detection logic.

Figure 5:
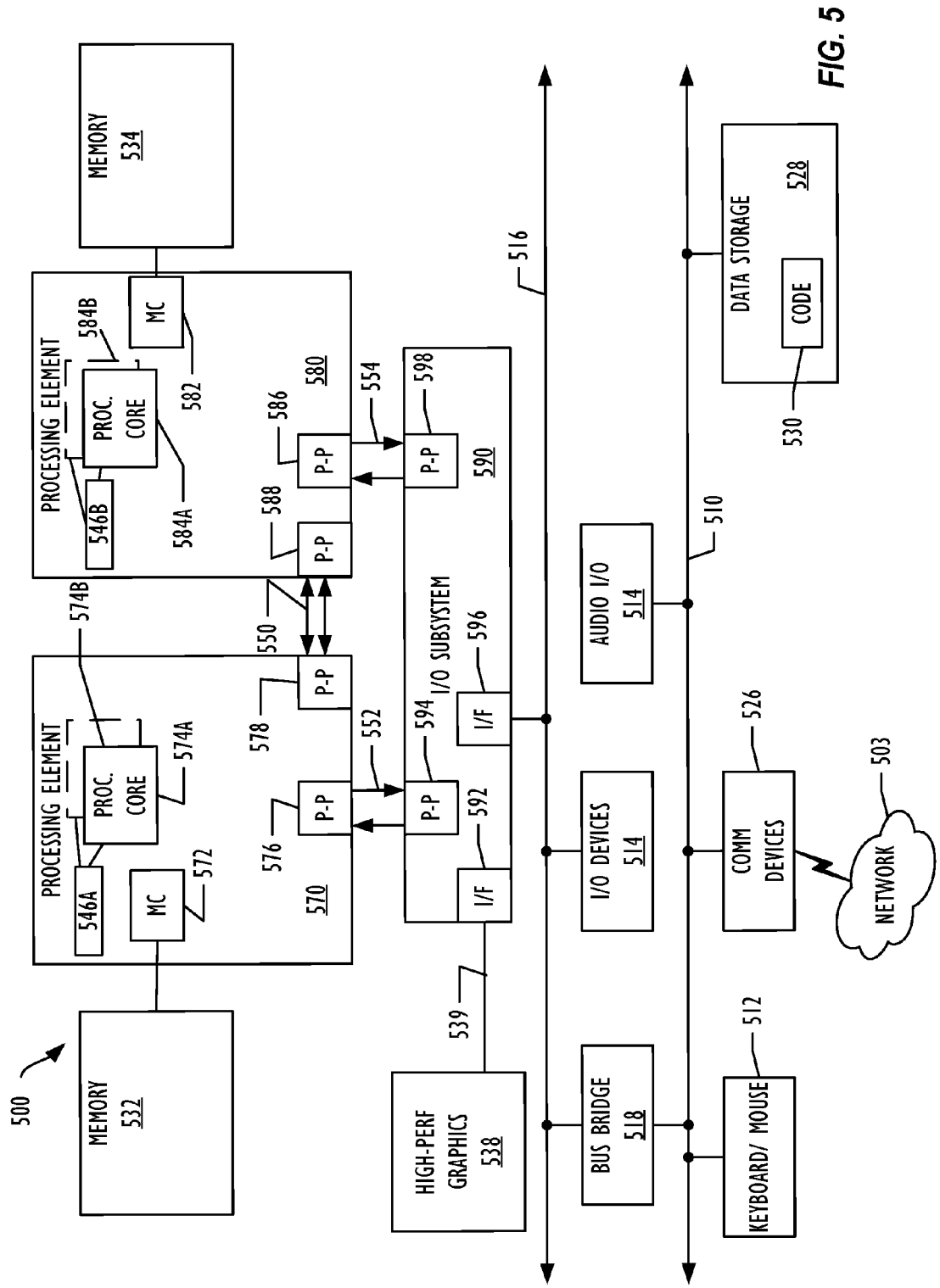
FIG. 5 is a block diagram illustrating a programmable device for use with techniques described herein according to one embodiment.

Referring now to FIG. 5, a block diagram illustrates a programmable device 500 that may employ the sandbox environment in accordance with one embodiment. The programmable device illustrated in FIG. 5 is a multiprocessor programmable device 500 that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-3. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There can be a variety of differences between the processing elements 570, 580 in terms of a spectrum of metrics of merit including architectural, microarchitectural, thermal, power consumption characteristics, and the like. These differences may effectively manifest themselves as asymmetry and heterogeneity amongst the processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple the processing elements 570, 580 to respective memories, namely a memory 532 and a memory 534, which may be portions of main memory locally attached to the respective processors. While MC logic 572 and 582 is illustrated as integrated into the processing elements 570, 580, in some embodiments the MC logic may be discrete logic outside the processing elements 570, 580 rather than integrated therein.

Processing element 570 and processing element 580 may be coupled to an I/O subsystem 590 via P-P interconnects 576, 586 and 584, respectively. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, bus 549 may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514 may be coupled to first link 516, along with a bridge 518 which may couple first link 516 to a second link 510. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link can be used. Also, the elements of FIG. 5 may alternatively be partitioned using more or fewer integrated chips than illustrated in FIG. 5.

Figure 6:
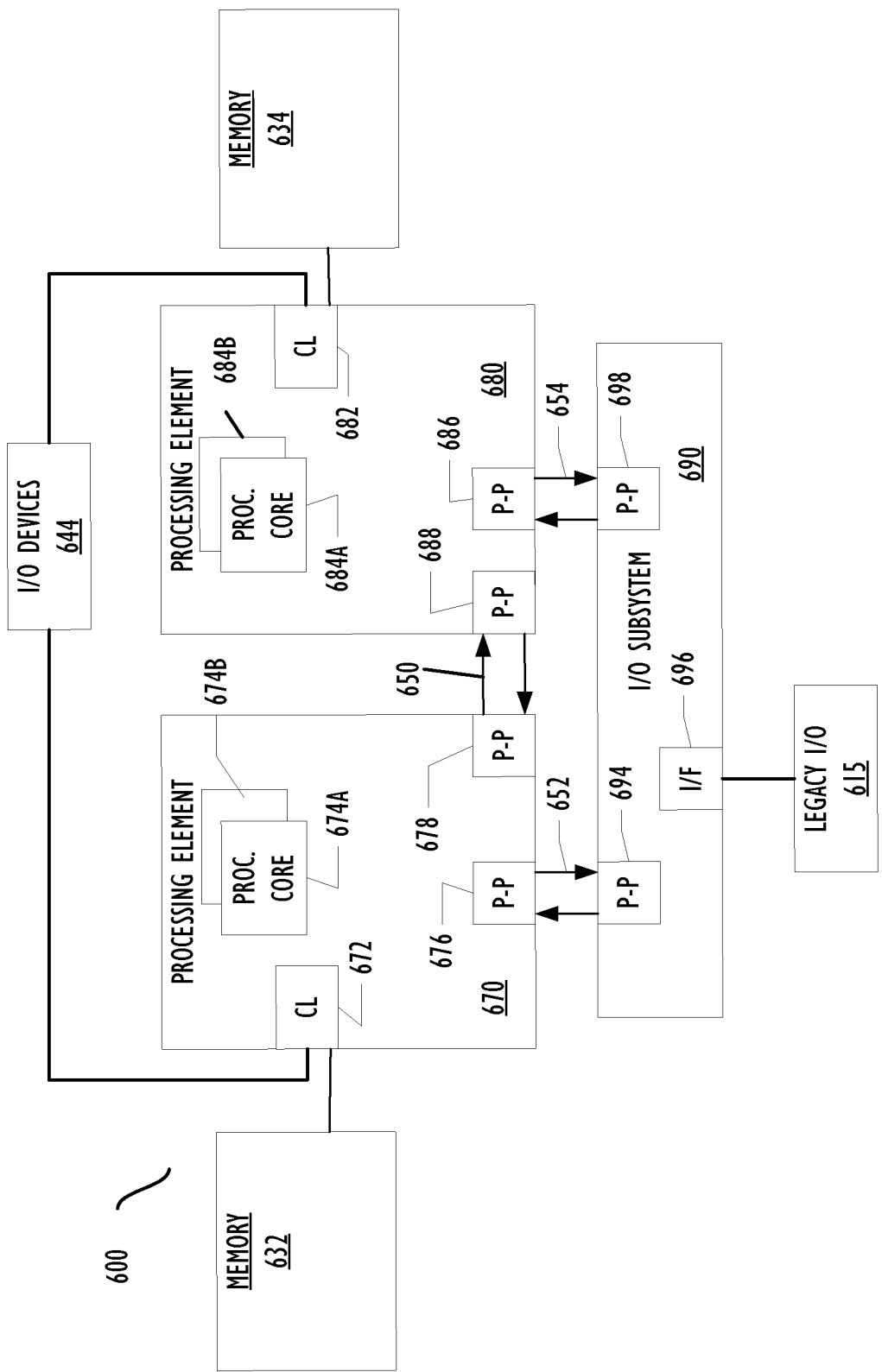
FIG. 6 is a block diagram illustrating a programmable device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the CL 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 614 may also be coupled to the control logic 672, 682. Legacy I/O devices 615 may be coupled to the I/O subsystem 690.

The programmable devices depicted in FIGS. 5 and 6 are schematic illustrations of embodiments of programmable devices which may be utilized to implement various embodiments discussed herein. It will be appreciated that various components of the programmable devices depicted in FIGS. 5 and 6 may be combined in a system-on-a-chip (SoC) architecture.

Figure 7:
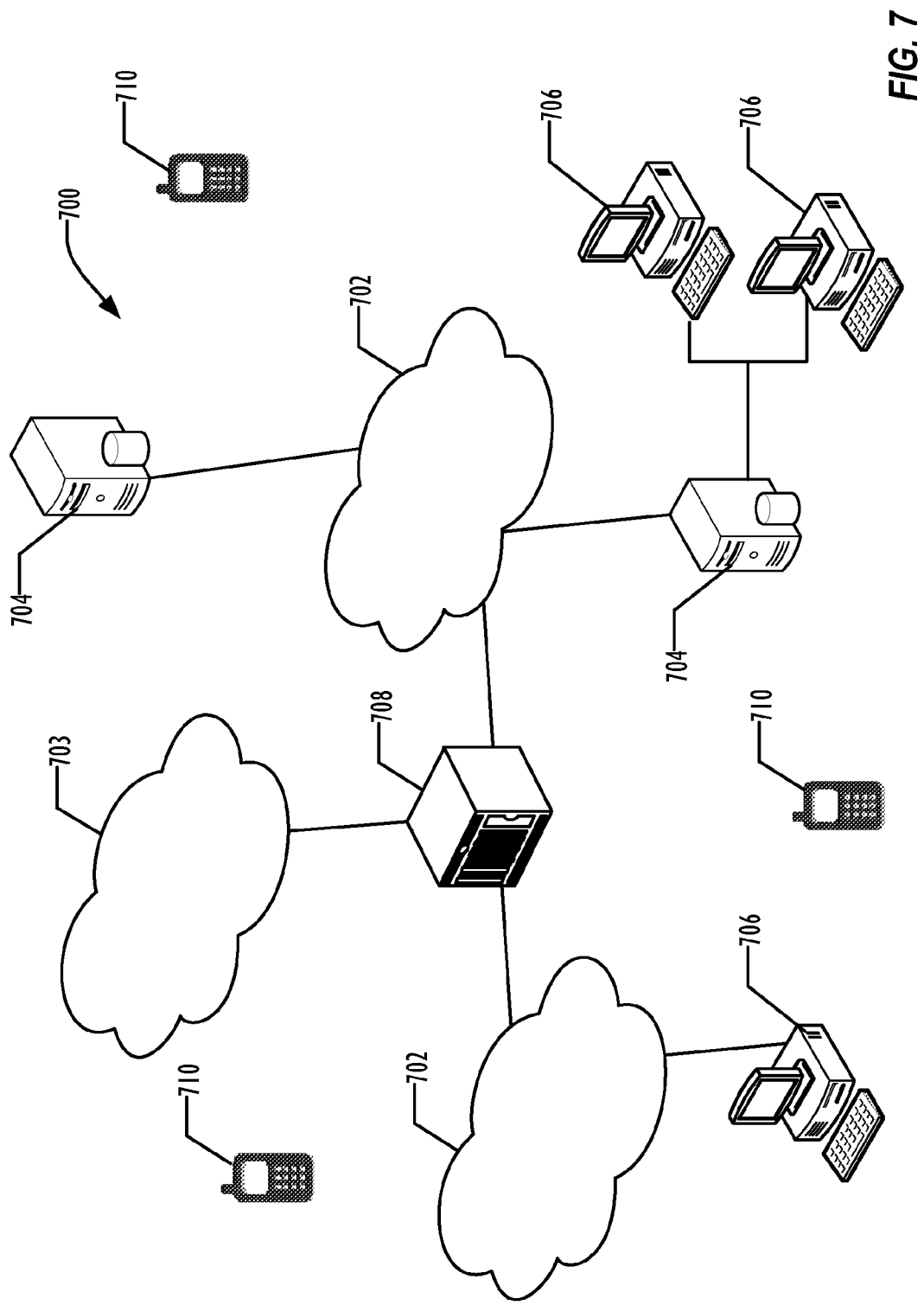
FIG. 7 is a block diagram illustrating a network of programmable devices in which the techniques described herein may be implemented.

Referring now to FIG. 7, an example infrastructure 700 is illustrated schematically. Infrastructure 700 contains computer networks 702. Computer networks 702 may include many different types of computer networks available today, such as the Internet, a corporate network, or a Local Area Network (LAN). Each of these networks can contain wired or wireless devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of devices (e.g., tablet computers, not shown). Mobile devices in the infrastructure 700 are illustrated as mobile phones 710.

In an infrastructure such as that illustrated in FIG. 7, systems that employ sandbox environments may be connected to any of the various networks 702 or 703. These systems may include any type of network connected device, including mobile devices 710 and embedded programmable devices (not shown). In addition, non-network connected programmable devices may also employ sandboxes. Thus the techniques described above may be used in a wide variety of devices.

By modifying a sandbox environment to monitor a small number of predetermined methods used in the sandbox environment, exploits that allow an application to escape the sandbox may be detected efficiently and effectively, with few or no false positives, without depending on signature-based techniques or monitoring post-exploit behaviors. Thus unknown exploits and exploits that generate no strong indicator of suspicious behavior may be detected.

The following examples pertain to further embodiments.

Example 1 is a machine-readable medium on which are stored instructions, including instructions that when executed by a programmable device, cause the programmable device to: instantiate a sandbox environment on the programmable device; and inject code into the sandbox environment, the code including instructions that when executed by the programmable device, instruments a method of the sandbox to cause the programmable device to detect an attempt to escape from the sandbox environment without depending on knowledge of an exploit used to attempt to escape the sandbox environment.

Example 2 includes the subject matter of example 1, wherein the method is a method that provides a reference to a security manager object.

Example 3 includes the subject matter of example 2, wherein the instructions that when executed instrument a method of the sandbox to cause the programmable device to detect an attempt to escape from the sandbox environment without depending on knowledge of the exploit used to attempt to escape the sandbox environment include instructions that when executed cause the method of the sandbox to: indicate an attempt to escape has occurred responsive to an invocation of the method returning a value indicating that no security manager object exists.

Example 4 includes the subject matter of example 2, wherein the instructions that when executed instrument a method of the sandbox to cause the programmable device to detect an attempt to escape from the sandbox environment without depending on knowledge of the exploit used to attempt to escape the sandbox environment include instructions that when executed cause the method of the sandbox to: indicate an attempt to escape has occurred if an invocation of the method returns a value indicating that the security manager object has been disabled.

Example 5 includes the subject matter of example 1, wherein the method is a method that executes a specified command in a separate process on the programmable device.

Example 6 includes the subject matter of example 5, wherein the instructions that when executed instrument a method of the sandbox to cause the programmable device to detect an attempt to escape from the sandbox environment without depending on knowledge of the exploit used to attempt to escape the sandbox environment include instructions that when executed cause the method of the sandbox to: check a permission status of an application invoking the method; and indicate an attempt to escape responsive to the application having a predetermined set of permissions.

Example 7 includes the subject matter of example 5, wherein the instructions that when executed instrument a method of the sandbox to cause the programmable device to detect an attempt to escape from the sandbox environment without depending on knowledge of the exploit used to escape the sandbox environment include instructions that when executed cause the method of the sandbox to: check a permission status of an application invoking the method; and indicate an attempt to escape responsive to the application having one or more predetermined permissions.

Example 8 includes the subject matter of example 5, wherein the instructions that when executed instrument a method of the sandbox to cause the programmable device to detect an attempt to escape from the sandbox environment without depending on knowledge of the exploit used to attempt to escape the sandbox environment include instructions that when executed cause the method of the sandbox to: check a permission status of an application invoking the method; and indicate an attempt to escape responsive to the application having a predetermined permission.

Example 9 includes the subject matter of any of examples 1-8, wherein the instructions that when executed by the programmable device cause the programmable device to inject code into the sandbox environment include instructions that when executed cause the programmable device to inject code into the sandbox environment after the sandbox environment has started.

Example 10 includes the subject matter of any of examples 1-8, wherein the instructions further include instructions that when executed cause the programmable device to terminate an application attempting to escape the sandbox environment.

Example 11 includes the subject matter of any of examples 1-8, wherein the instructions further include instructions that when executed cause the programmable device to report an application attempting to escape the sandbox environment.

Example 12 includes the subject matter of any of examples 1-8, wherein the instructions further include instructions that when executed cause the programmable device to terminate or report an application attempting to escaped the sandbox environment.

Example 13 is a method of detecting an attempt to escape from a bytecode-based sandbox environment of a programmable device, including: instantiating the sandbox environment in the programmable device; injecting bytecode into a predetermined method of the sandbox environment; executing the bytecode in the predetermined method upon invocation of the method by an application; and indicating an attempt to escape from the sandbox by the application without depending on knowledge of an exploit used by the application to attempt to escape from the sandbox.

Example 14 includes the subject matter of example 13, wherein the predetermined method of the sandbox environment is a method that provides a reference to a security manager object.

Example 15 includes the subject matter of example 14, wherein indicating an attempt to escape from the sandbox by the application includes: indicating an attempt to escape from the sandbox responsive to the method indicating that no security manager object exists.

Example 16 includes the subject matter of example 13, wherein the predetermined method of the sandbox environment is a method that allows the application to execute a command in a separate process on the programmable device.

Example 17 includes the subject matter of example 16, wherein executing the bytecode in the predetermined method includes: checking a permission status of the application; and wherein indicating an attempt to escape includes: indicating an attempt to escape from the sandbox responsive to the application having a predetermined permission status.

Example 18 includes the subject matter of example 13, wherein the predetermined method of the sandbox environment is a method that provides a reference to a security manager object; and wherein indicating an attempt to escape from the sandbox by the application includes: indicating an attempt to escape from the sandbox responsive to the method indicating that no security manager object exists or that the security manager object has been disabled.

Example 19 includes the subject matter of example 13, wherein the predetermined method of the sandbox environment is a method that allows the application to execute a command in a separate process on the programmable device; and wherein executing the bytecode in the predetermined method includes: checking a permission status of the application; and wherein indicating an escape includes: indicating an attempt to escape from the sandbox responsive to the application having a predetermined permission status.

Example 20 is an apparatus including means to perform a method as set forth in any of examples 13-19.

Example 21 is a system for allowing applications to run in a sandbox environment, including: a programmable device; an operating system for the programmable device; a virtual machine environment, configured for execution under the operating system, that when executed by the programmable device creates a sandbox environment; detection logic to instrument a method of the sandbox environment to detect that an application executing in the sandbox environment has attempted to escape the sandbox environment, without depending on knowledge of an exploit used to attempt to escape the sandbox environment, wherein the virtual machine environment includes: an agent class object; and a class loader method of the virtual machine environment, configured to load the agent class object upon initialization of the virtual machine environment, and wherein the agent class object is configured to inject the detection logic into a predetermined method of the sandbox environment.

Example 22 includes the subject matter of example 21, wherein the detection logic includes bytecode.

Example 23 includes the subject matter of example 21, wherein the predetermined method is a method that provides a reference to a security manager object.

Example 24 includes the subject matter of example 23, wherein the detection logic, when injected by the agent class object into the predetermined method of the sandbox environment, is configured to cause the predetermined method to indicate that an attempt to escape has occurred responsive to an invocation of the method returning a value that no security manager exists.

Example 25 includes the subject matter of example 21, wherein the predetermined method of the sandbox environment is a method that provides a reference to a security manager object; and wherein indicating an attempt to escape from the sandbox by the application includes: indicating an attempt to escape from the sandbox responsive to the method indicating that no security manager object exists or that the security manager object has been disabled.

Example 26 includes the subject matter of example 21, wherein the predetermined method of the sandbox environment is a method that allows the application to execute a command in a separate process on the programmable device; and wherein executing the bytecode in the predetermined method includes: checking a permission status of the application; and wherein indicating an escape includes: indicating an attempt to escape from the sandbox responsive to the application having a predetermined permission status.

Example 27 includes the subject matter of example 21, wherein the predetermined method is a method that when executed causes a command to execute on the programmable device as a separate process.

Example 28 includes the subject matter of example 27, wherein the detection logic, when injected by the agent class object into the predetermined method of the sandbox environment, is configured to cause the predetermined method to: check a permission status of the application; and indicate an attempt to escape has occurred responsive to the application having a predetermined set of permissions.

Example 29 includes the subject matter of example 27, wherein the detection logic, when injected by the agent class object into the predetermined method of the sandbox environment, is configured to cause the predetermined method to: check a permission status of the application; and indicate an attempt to escape has occurred responsive to the application having a predetermined permission.

Example 30 includes the subject matter of any of examples 21-29, wherein the detection logic is configured to terminate the application attempting to escape the sandbox.

Example 31 includes the subject matter of any of examples 21-29, wherein agent class object is configured to inject the detection logic into the predetermined method of the sandbox environment after the sandbox environment has started.

Example 32 is a programmable device, including: a processing element, configured to provide a sandbox environment; a memory, coupled to the processing element, on which are stored instructions that when executed by the processing element cause the processing element to: instantiate the sandbox environment on the programmable device; and inject code into the sandbox environment, the code including instructions that when executed by the processing element, instruments a method of the sandbox to cause the processing element to detect an attempt to escape by an application from the sandbox environment independent of the application.

Example 33 includes the subject matter of example 32, wherein the method is a method that provides a reference to a security manager object.

Example 34 includes the subject matter of example 33, wherein the instructions that when executed instrument a method of the sandbox to cause the programmable device to detect an attempt to escape by an application from the sandbox environment independent of the application include instructions that when executed cause the method of the sandbox to: indicate an attempt to escape has occurred responsive to an invocation of the method returning a value indicating that no security manager object exists.

Example 35 includes the subject matter of example 33, wherein the instructions that when executed instrument a method of the sandbox to cause the programmable device to detect an attempt to escape by an application from the sandbox environment independent of the application the sandbox environment include instructions that when executed cause method of the sandbox to: indicate an attempt to escape has occurred if an invocation of the method returns a value indicating that the security manager object has been disabled.

Example 36 includes the subject matter of example 32, wherein the method is a method that executes a specified command in a separate process on the programmable device.

Example 37 includes the subject matter of example 36, wherein the instructions that when executed instrument a method of the sandbox to cause the programmable device to detect an attempt to escape by an application from the sandbox environment independent of the application include instructions that when executed cause the method of the sandbox to: check a permission status of the application; and indicate an attempt to escape responsive to the application having a predetermined set of permissions.

Example 38 includes the subject matter of example 36, wherein the instructions that when executed instrument a method of the sandbox to cause the programmable device to detect an attempt to escape by an application from the sandbox environment independent of the application include instructions that when executed cause the method of the sandbox to: check a permission status of the application; and indicate an attempt to escape responsive to the application having a predetermined permission.

Example 39 includes the subject matter of any of examples 32-38, wherein the instructions that when executed by the programmable device cause the programmable device to inject code into the sandbox environment include instructions that when executed cause the programmable device to inject code into the sandbox environment after the sandbox environment has started.

Example 40 includes the subject matter of any of examples 32-38, wherein the instructions further include instructions that when executed cause the programmable device to terminate the application attempting to escape the sandbox environment.

Example 41 includes the subject matter of any of examples 32-38, wherein the instructions further include instructions that when executed cause the programmable device to report the application attempting to escape the sandbox environment.

Example 42 is an apparatus for detecting an attempt to escape from a bytecode-based sandbox environment of a programmable device, including: means for instantiating the sandbox environment in the programmable device; and means for injecting bytecode into a predetermined method of the sandbox environment; means for executing the bytecode in the predetermined method upon invocation of the method by an application; and means for indicating an attempt to escape from the sandbox by the application without depending on knowledge of an exploit used by the application to attempt to escape from the sandbox.

The above description is intended to be illustrative, and not restrictive. For example, the above-described embodiments may be used in combination with each other. Many other embodiments will be apparent to those of skill in the art upon reviewing the above description.

We claim:

1. A nontransitory machine-readable medium on which are stored instructions, comprising instructions that when executed by a programmable device, cause the programmable device to:
   instantiate a sandbox environment on the programmable device; and
   inject code into the sandbox environment, the code comprising instructions that when executed by the programmable device, instruments a method of the sandbox to cause the programmable device to:
   detect an attempt to escape from the sandbox environment without depending on knowledge of an exploit used to attempt to escape the sandbox environment, wherein the method of the sandbox provides a reference to a security manager object; and
   indicate that an attempt to escape has occurred when an invocation of the method returns a value that is associated with a change to the security manager object.

2. The nontransitory machine-readable medium of claim 1, wherein the instructions that when executed instrument a method of the sandbox to cause the programmable device to detect an attempt to escape from the sandbox environment without depending on knowledge of the exploit used to attempt to escape the sandbox environment comprise instructions that when executed cause the method of the sandbox to:
   indicate an attempt to escape has occurred responsive to an invocation of the method returning a value indicating that no security manager object exists.

3. The nontransitory machine-readable medium of claim 1, wherein the instructions that when executed instrument a method of the sandbox to cause the programmable device to detect an attempt to escape from the sandbox environment without depending on knowledge of the exploit used to attempt to escape the sandbox environment comprise instructions that when executed cause the method of the sandbox to:
   indicate an attempt to escape has occurred if an invocation of the method returns a value indicating that the security manager object has been disabled.

4. The nontransitory machine-readable medium of claim 1, wherein the method is a method that executes a specified command in a separate process on the programmable device.

5. The nontransitory machine-readable medium of claim 4, wherein the instructions that when executed instrument a method of the sandbox to cause the programmable device to detect an attempt to escape from the sandbox environment without depending on knowledge of the exploit used to attempt to escape the sandbox environment comprise instructions that when executed cause the method of the sandbox to:
   check a permission status of an application invoking the method; and
   indicate an attempt to escape responsive to the application having a predetermined set of permissions.

6. The nontransitory machine-readable medium of claim 4, wherein the instructions that when executed instrument a method of the sandbox to cause the programmable device to detect an attempt to escape from the sandbox environment without depending on knowledge of the exploit used to attempt to escape the sandbox environment comprise instructions that when executed cause the method of the sandbox to:
   check a permission status of an application invoking the method; and
   indicate an attempt to escape responsive to the application having a predetermined permission.

7. The nontransitory machine-readable medium of claim 1, wherein the instructions that when executed by the programmable device cause the programmable device to inject code into the sandbox environment comprise instructions that when executed cause the programmable device to inject code into the sandbox environment after the sandbox environment has started.

8. The nontransitory machine-readable medium of claim 1, wherein the instructions further comprise instructions that when executed cause the programmable device to terminate an application attempting to escape the sandbox environment.

9. The nontransitory machine-readable medium of claim 1, wherein the instructions further comprise instructions that when executed cause the programmable device to report an application attempting to escape the sandbox environment.

10. A method of detecting an attempt to escape from a bytecode-based sandbox environment of a programmable device, comprising:
  instantiating the sandbox environment in the programmable device;
  injecting bytecode into a predetermined method of the sandbox environment; wherein the predetermined method provides a reference to a security manager object;
  executing the bytecode in the predetermined method upon invocation of the method by an application;
  indicating an attempt to escape from the sandbox by the application without depending on knowledge of an exploit used by the application to attempt to escape from the sandbox; wherein the indicating of the attempt using a value associated with a change to the security manager object that is returned when the predetermined method is invoked.

11. The method of claim 10, wherein indicating an attempt to escape from the sandbox by the application comprises:
  indicating an attempt to escape from the sandbox responsive to the method indicating that no security manager object exists.

12. The method of claim 10, wherein the predetermined method of the sandbox environment is a method that allows the application to execute a command in a separate process on the programmable device.

13. The method of claim 12, wherein executing the bytecode in the predetermined method comprises:
  checking a permission status of the application; and
  wherein indicating an attempt to escape comprises:
    indicating an attempt to escape from the sandbox responsive to the application having a predetermined permission status.

14. A system for allowing applications to run in a sandbox environment, comprising:
  a programmable device;
  an operating system for the programmable device;
  a virtual machine environment, configured for execution under the operating system, that when executed by the programmable device creates a sandbox environment;
  detection logic to instrument a method of the sandbox environment to detect that an application executing in the sandbox environment has attempted to escape the sandbox environment, without depending on knowledge of an exploit used to attempt to escape the sandbox environment,
  wherein the virtual machine environment comprises:
    an agent class object; and
    a class loader method of the virtual machine environment, configured to load the agent class object upon initialization of the virtual machine environment, and
    wherein the agent class object is configured to inject the detection logic into a predetermined method of the sandbox environment; and
    wherein the predetermined method provides a reference to a security manager object; and detects that an application has attempted to escape responsive to an invocation of the predetermined method returning a value that is associated with a change to the security manager object.

15. The system of claim 14, wherein the detection logic comprises bytecode.

16. The system of claim 14, wherein the detection logic, when injected by the agent class object into the predetermined method of the sandbox environment, is configured to cause the predetermined method to indicate that an attempt to escape has occurred responsive to an invocation of the method returning a value that no security manager exists.

17. The system of claim 14, wherein the predetermined method is a method that when executed causes a command to execute on the programmable device as a separate process.

18. The system of claim 17, wherein the detection logic, when injected by the agent class object into the predetermined method of the sandbox environment, is configured to cause the predetermined method to:
  check a permission status of the application; and
  indicate an attempt to escape has occurred responsive to the application having a predetermined set of permissions.

19. The system of claim 17, wherein the detection logic, when injected by the agent class object into the predetermined method of the sandbox environment, is configured to cause the predetermined method to:
  check a permission status of the application; and
  indicate an attempt to escape has occurred responsive to the application having a predetermined permission.

20. The system of claim 14, wherein the detection logic is configured to terminate the application attempting to escape the sandbox.

21. The system of claim 14, wherein agent class object is configured to inject the detection logic into the predetermined method of the sandbox environment after the sandbox environment has started.

\* \* \* \* \*